(12) United States Patent
Suzuki

(10) Patent No.: US 9,482,911 B2
(45) Date of Patent: Nov. 1, 2016

(54) DISPLAY PANEL AND DISPLAY DEVICE

(71) Applicant: BOE TECHNOLOGY GROUP CO., LTD., Beijing (CN)

(72) Inventor: Teruaki Suzuki, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/053,824

(22) Filed: Oct. 15, 2013

(65) Prior Publication Data

US 2014/0104557 A1     Apr. 17, 2014

(30) Foreign Application Priority Data

Oct. 15, 2012 (CN) .......................... 2012 1 0390992

(51) Int. Cl.
  *G02F 1/1343*     (2006.01)

(52) U.S. Cl.
  CPC .................. *G02F 1/134363* (2013.01); *G02F 2001/134372* (2013.01)

(58) Field of Classification Search
  CPC ................................................ G02F 1/134363
  USPC ......................................................... 349/141
  See application file for complete search history.

(56) References Cited

U.S. PATENT DOCUMENTS

| 2003/0081163 A1* | 5/2003 | Suzuki et al. ................. 349/139 |
| 2004/0017532 A1* | 1/2004 | Ishikawa et al. ............. 349/141 |
| 2005/0264743 A1 | 12/2005 | Suzuki et al. |
| 2007/0268440 A1* | 11/2007 | Nagano ......................... 349/141 |
| 2008/0018834 A1 | 1/2008 | Matsushima et al. |
| 2008/0068549 A1* | 3/2008 | Liao .................. G02F 1/134363 349/141 |
| 2008/0151169 A1* | 6/2008 | Park et al. ..................... 349/143 |
| 2012/0146889 A1* | 6/2012 | Kwak ............... G02F 1/134363 345/88 |
| 2012/0176561 A1* | 7/2012 | Kim et al. ..................... 349/46 |

FOREIGN PATENT DOCUMENTS

| CN | 1181517 A | 5/1998 |
| CN | 101078841 A | 11/2007 |
| CN | 101109832 A | 1/2008 |
| CN | 202049313 U | 11/2011 |

OTHER PUBLICATIONS

First Chinese Office Action dated Oct. 9, 2015; Appln. No. 201210390992.4.
Second Chinese Office Action dated Apr. 20, 2016; Appln. No. 201210390992.4.

* cited by examiner

*Primary Examiner* — Nathanael R Briggs
*Assistant Examiner* — Alexander Gross
(74) *Attorney, Agent, or Firm* — Ladas & Parry LLP

(57) ABSTRACT

The embodiments of the present invention provides a display panel comprising a liquid crystal layer and a plurality of pixel units; the pixel units comprise at least two electrode units; the electrode units comprise an IPS mode electrode unit and an ADS mode electrode unit; the IPS mode electrode unit has an electrode angle different from an electrode angle of the ADS mode electrode unit. The present invention further provides a display device comprising the display panel.

11 Claims, 4 Drawing Sheets

DISPLAY PANEL AND DISPLAY DEVICE

TECHNICAL FIELD

Embodiments of the present invention relates to a display panel and a display device.

BACKGROUND

With rapid growth of tablet PC and smart phone in the market, demands for LCD panel with a wide angle of view are continuously increasing. Currently, the most common LCD panels with a wide angle of view are an in-plane switching mode LCD panel (hereinafter referred to as IPS mode LCD for short) and an advanced super dimension switching mode LCD panel of (hereinafter referred to as ADS mode LCD for short).

The IPS mode LCD panel increases an angle of view by an in-plane switching of liquid crystal molecules 4, which enables the liquid crystal molecules 4 to rotate with a maximum plane rotation angle by taking advantage of space thickness, frictional strength as well as effectively changing the transverse driving electric field, thereby increasing the angle of view. That is to say, the liquid crystal molecules 4 in a conventional LCD panel are switched between vertical and horizontal positions as a manner of passing backlight, while the liquid crystal molecules 4 in the IPS mode LCD panel are changed to a horizontal rotation switching as a manner of passing backlight, such that an angle of view of about 180° can be obtained without additional compensation films. FIG. 1 illustrates a schematic diagram of the IPS mode LCD panel. As shown in FIG. 1, pixel electrodes 1 and common electrodes 2 are strip-shaped electrodes arranged alternately on a substrate of the IPS mode LCD panel, and the arrow A indicates an initial orientation direction of positive dielectric anisotropy liquid crystals. An electrical field generated between the pixel electrodes 1 and common electrodes 2 drives the liquid crystal molecules 4 to rotate in a plane. However, IPS mode LCD panel has the following disadvantages: the transverse driving electrical fields just exist in slits between the electrodes and there is no electrical field over the electrodes for the equipotential over the electrodes. Therefore, the pixel has a small valid switching area. Thus, the IPS mode LCD panel has a low aperture opening ratio and a low transmittance.

In the ADS mode LCD panel, a multidimensional electric field is generated. The multidimensional electric field comprises an electric field generated between edges of slit electrodes in the same plane and an electric field generated between the layers of slit electrodes and plate electrodes, and the multidimensional electric field can rotate all liquid crystal molecules over the electrodes and between the slit electrodes in the liquid crystal cell, thereby improving the working efficiency of liquid crystals and increasing the transmittance as well. FIG. 2 illustrates a schematic diagram of the ADS mode LCD panel. As shown in FIG. 2, the pixel electrodes 1 (which are slit electrodes) and the common electrodes 2 (which are plate electrodes) are arranged in different layers in the ADS mode LCD panel.

The ADS technology can improve the display quality of TFT-LCD products, and have advantages such as high resolution, high transmittance, low power consumption, a wide angle of view, high aperture opening ratio, low chromatic aberration, no push Mura and etc.

However, both of the IPS mode LCD panel and the ADS mode LCD panel have disadvantages, respectively, thereby resulting in bad display quality of single mode LCD panel.

SUMMARY

One technical problem solved by the embodiments of the present invention is to take advantages of the ADS technology and the IPS technology and avoid disadvantages thereof, for further improving the display quality of an LCD panel.

In order to solve the above technical problem, the embodiments of the present invention provide a technical solutions as follows:

A display panel comprising a liquid crystal layer and a plurality of pixel units, which comprise at least two electrode units; the at least two electrode units comprising an IPS mode electrode unit and an ADS mode electrode unit; the IPS mode electrode unit has an electrode angle different from an electrode angle of the ADS mode electrode.

Optionally, if liquid crystals in the liquid crystal layer are positive dielectric anisotropy liquid crystals, the electrode angle of the IPS mode electrode unit is larger than the electrode angle of the ADS mode electrode unit.

Optionally, the electrode angle of the IPS mode electrode unit is within a range of 10° to 20°, and the electrode angle of the ADS mode electrode unit is within a range of 5° to 15°.

Optionally, if liquid crystals in the liquid crystal layer are negative dielectric anisotropy liquid crystals, the electrode angle of the IPS mode electrode unit is less than the electrode angle of the ADS mode electrode unit.

Optionally, the electrode angle of the IPS mode electrode unit is within a range of 70° to 80°, and the electrode angle of the ADS mode electrode unit is within a range of 75° to 85°.

Optionally, if liquid crystals in the liquid crystal layer are positive dielectric anisotropy liquid crystals, the electrode units comprise an IPS mode electrode unit, an ADS mode electrode unit and an IPS mode electrode unit, which are connected successively in an initial orientation direction of liquid crystals molecules.

Optionally, if liquid crystals in the liquid crystal layer are negative dielectric anisotropy liquid crystals, the electrode units comprise an IPS mode electrode unit, an ADS mode electrode unit and an IPS mode electrode unit, which are connected successively in a direction vertical to an initial orientation direction of liquid crystals molecules.

Optionally, the IPS mode electrode unit is composed of strip-shaped pixel electrodes and strip-shaped common electrodes, which are arranged alternately.

Optionally, the IPS mode electrode unit has pixel electrodes and common electrodes having a structure of V-shape, and a tip region of which has a protrusion.

Optionally, the ADS mode electrode units are composed of pixel electrodes and common electrodes which are arranged in different layers, and either of the pixel electrodes and the common electrodes comprise a plurality of strip-shaped electrodes, and the other of the pixel electrodes and the common electrodes are plate electrodes.

The embodiments of the present invention further provide a display device comprising one of the above display panels.

The display panels provided in the embodiments of the present invention can enable to obtain optimal electrode angles in the ADS region and the IPS region respectively, such that the advantages of the IPS mode electrode unit and the ADS mode electrode unit can be maintained, thereby obtaining a better display effect of the display panel. And a better display effect can also be obtained in a liquid crystal display (LCD) adopting the display device provided in embodiments of the present invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The display panel in the embodiments of the present invention comprises a liquid crystal layer; the display panel comprises a plurality of pixel units which comprising at least two electrode units; the at least two electrode units comprising an IPS mode electrode unit and an ADS mode electrode unit; the IPS mode electrode unit has an electrode angle different from that of the ADS mode electrode unit.

Each of the ADS mode electrode unit and the IPS mode electrode unit comprises strip-shaped electrodes. The term "electrode angle" refers to an acute angle included between an inclined direction of the strip-shaped electrode and an initial orientation direction of liquid crystal molecules.

If liquid crystals in the liquid crystal layer are positive dielectric anisotropy liquid crystals, the electrode angle of the IPS mode electrode unit is larger than the electrode angle of the ADS mode electrode unit. The electrode angle of the IPS mode electrode unit is within a range of 10° to 20°, and the electrode angle of the ADS mode electrode unit is within a range of 5° to 15°.

If liquid crystals in the liquid crystal layer are negative dielectric anisotropy liquid crystals, the electrode angle of the IPS mode electrode unit is less than the electrode angle of the ADS mode electrode unit. And the electrode angle of the IPS mode electrode unit is within a range of 70° to 80°, and the electrode angle of the ADS mode electrode unit is within a range of 75° to 85°.

The structure of each pixel unit in the display panel of the embodiments of the present invention will be further described in combination with the specific embodiments.

Figure 1:
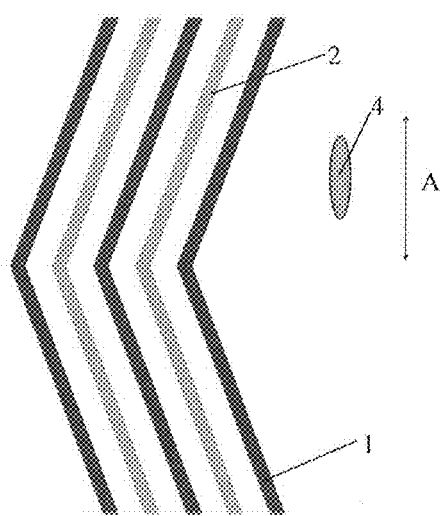
FIG. 1 is a schematic diagram of an IPS mode LCD panel.
Figure 2:
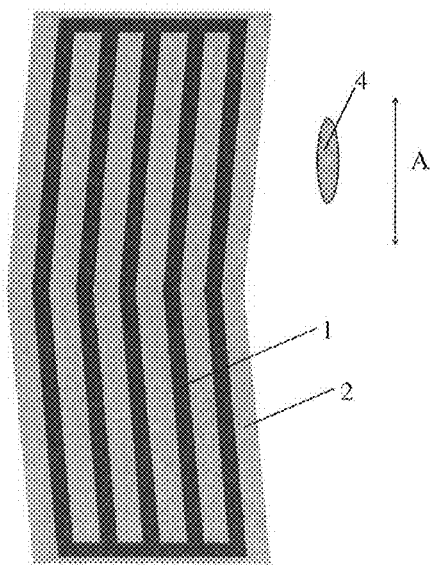
FIG. 2 is a schematic diagram of an ADS mode LCD panel.
Figure 3:
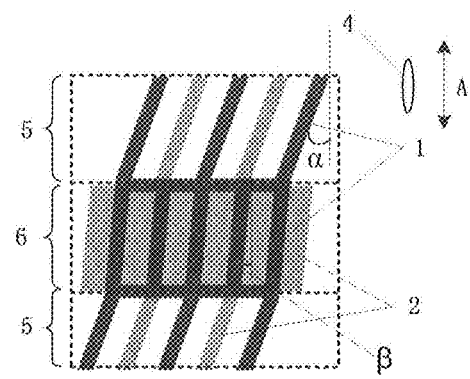
FIG. 3 is a structural schematic diagram of pixel units of a mixed mode display panel according to the first embodiment of the present invention.

FIG. 3 is a structural schematic diagram of pixel units in a mixed mode display panel according to the first embodiment of the present invention. As shown in FIG. 3, in the mixed mode LCD panel as illustrated, the electrode units which constitute the pixel units comprise an IPS mode electrode unit 5, an ADS mode electrode unit 6 and an IPS mode electrode unit 5, which are connected successively in an initial orientation direction A of positive dielectric anisotropy liquid crystals. The IPS mode electrode unit and the ADS mode electrode unit have different electrode angles.

As shown in FIG. 3, the IPS mode electrode unit 5 is composed of a strip-shaped pixel electrode 1 and a strip-shaped common electrode 2, which are arranged alternately; the ADS mode electrode unit 6 is composed of pixel electrodes 1 and common electrodes 2 which are disposed in different layers, wherein the pixel electrodes 1 are strip-shaped electrodes, and the common electrodes 2 are electrodes covering the whole layer. It can be understood to a person skilled in the art that, in the ADS mode electrode unit, the pixel electrode can be an electrode covering the whole layer and the common electrode can be a strip-shaped electrode. It needs to be explained that, in the embodiments of the present application, the strip-shaped electrodes of the ADS mode electrode unit are equivalent to slit electrodes and the electrodes covering the whole layer are equivalent to plate electrodes.

To be specific, if liquid crystals in a liquid crystal layer of a display panel comprising pixel units of the display panel as illustrated in FIG. 3 are positive dielectric anisotropy liquid crystals, and the initial orientation direction of the liquid crystal molecules is indicated as the direction of arrow A, the electrode angle of the IPS mode electrode unit 5 is shown as angle α and the electrode angle of the ADS mode electrode unit 6 is shown as angle β, wherein α is larger than β. Generally, the electrode angle α of the IPS mode electrode unit 5 is within a range of 10° to 20°, and the electrode angle β of the ADS mode electrode unit 6 is within a range of 5° to 15°. For example, the electrode angle α of the IPS mode electrode unit 5 is 15°, and the electrode angle β of the ADS mode electrode unit 6 is within a range of 7° to 11°.

If liquid crystals in the liquid crystal layer of the display panel comprising pixel units as illustrated in FIG. 3 are negative dielectric anisotropy liquid crystals, the negative dielectric anisotropy liquid crystals have an initial orientation direction perpendicular to the direction A as shown in FIG. 3; in this case, the electrode angle of the pixel units constituted by negative dielectric anisotropy liquid crystals and the electrode angle of the pixel units constituted by positive dielectric anisotropy liquid crystals are complementary angles. In this way, if liquid crystals in the liquid crystal layer are negative dielectric anisotropy liquid crystals, the electrode angle of the IPS mode electrode unit 5 is less than the electrode angle of the ADS mode electrode unit 6; at this time, the electrode angle of the IPS mode electrode unit 5 is within a range of 70° to 80°, and the electrode angle of the ADS mode electrode unit 6 is within a range of 75° to 85°. For example, the electrode angle of the IPS mode electrode unit 5 is 75°, and the electrode angle of the ADS mode electrode unit 6 is within a range of 79° to 83°.

In terms of the electrode angle of the IPS mode electrode unit 5 and the electrode angle of the ADS mode electrode unit 6, the following embodiments are with the same as that of the IPS mode electrode unit 5 and that of the ADS mode electrode unit 6 as illustrated in FIG. 3, and it will not be elaborated here.

In the electrode units of the embodiments of the present invention, the area proportions between the IPS mode electrode unit and the ADS mode electrode unit can be designed according to the actual situations. Since the IPS mode pixel unit has a smaller pixel capacitance than the ADS mode pixel unit, it can optimize the pixel capacitances of whole pixel units through adjusting the area proportion between the IPS mode electrode unit and the ADS mode electrode unit in the same pixel unit, so as to meet the actual requirements in order to further improve the display quality.

In the embodiment of the present invention, the pixel unit is formed by an IPS mode electrode unit 5, an ADS mode electrode unit 6 and an IPS mode electrode unit 5. As the optimal electrode angles of the IPS mode electrode unit 5 and the ADS mode electrode unit 6 can be obtained respectively, the display effect of pixel can be better improved.

It should be noted that the structure of the pixel units of the embodiment of the present invention is not limited to what is shown in FIG. 3, it can comprise an ADS mode electrode unit, an IPS mode electrode unit and an ADS mode electrode unit which are connected successively in an initial orientation direction of the liquid crystals molecules.

Figure 4:
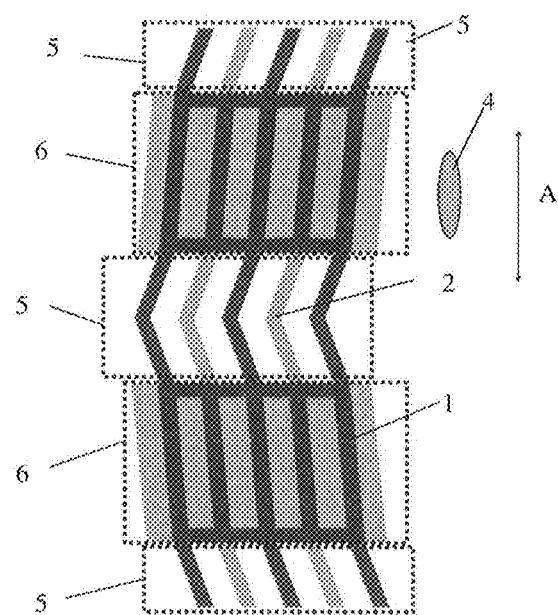
FIG. 4 is a structural schematic diagram of pixel units of a mixed mode display panel according to the second embodiment of the present invention.

FIG. 4 is a structural schematic diagram of pixel units of a mixed mode display panel according to the second embodiment of the present invention. In the mixed mode LCD panel as illustrated in the second embodiment, the electrode units which constitute the pixel units are mainly formed by the electrode structure as shown in FIG. 3 which are symmetrically connected, taking a direction perpendicular to an initial orientation direction A of positive dielectric anisotropy liquid crystals 4 as a symmetric axis. As illustrated in FIG. 4, a pixel structure comprises an IPS mode electrode unit 5, an ADS mode electrode unit 6 and an IPS mode electrode unit 5, which are connected successively in an initial orientation direction A of positive dielectric anisotropy liquid crystals 4. And such a pixel structure can refine the display effect of pixels.

Figure 5:
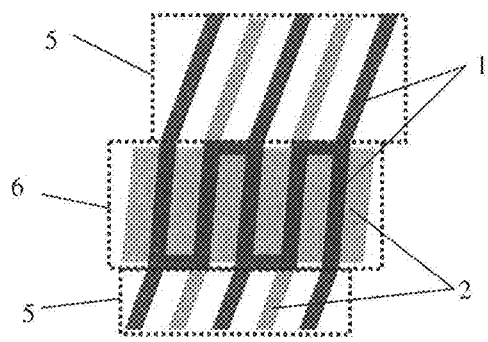
FIG. 5 is a structural schematic diagram of pixel units of a mixed mode display panel according to the third embodiment of the present invention.

FIG. 5 is a structural schematic diagram of pixel units of a mixed mode display panel according to the third embodiment of the present invention. As shown in FIG. 5, the IPS mode electrode unit 5 and the ADS mode electrode unit 6, which constitute the electrode units in the pixel units, are arranged in the same manner as the electrode units in the first embodiment as shown in FIG. 3. However, the manner in which the pixel electrodes 1 in the ADS mode electrode unit as illustrated in embodiment 3 are arranged is different from the manner in which the pixel electrodes 1 in the ADS mode electrode unit as illustrated in FIG. 3 are arranged. And more particularly, as shown in FIG. 5, the pixel electrodes 1 at upper and lower edges of the ADS mode electrode unit 6 are connected together by an arched structure. Such a pixel structure can also further improve the display quality.

It is understood to a person skilled in the art that the pixel structure of the embodiments of the present invention can also be formed by connecting more than two electrode units as shown in FIG. 5 in an orientation direction of positive dielectric anisotropy liquid crystals.

Figure 6:
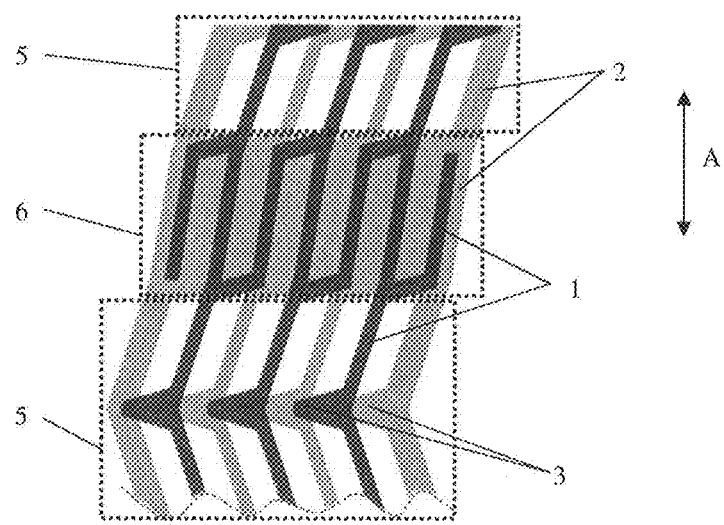
FIG. 6 is a structural schematic diagram of pixel units of a mixed mode display panel according to the forth embodiment of the present invention.

FIG. 6 is a structural schematic diagram of pixel units of a mixed mode display panel according to the forth embodiment of the present invention. As shown in FIG. 6, the electrode units, which constitute the pixel units, comprise an IPS mode electrode unit 5, an ADS mode electrode unit 6 and an IPS mode electrode unit 5, which are connected successively in the orientation direction of positive dielectric anisotropy liquid crystals. Compared with the electrode units as shown in FIG. 4 and FIG. 5, the manner in which the pixel electrodes 1 and the common electrodes 2 in the electrode unit are arranged in the forth embodiment is different from the manner in which the pixel electrodes and the common electrodes are arranged in FIG. 4 and FIG. 5 in that: the pixel electrodes 1 and the common electrodes 2 of the IPS mode electrode unit 5 are arranged in different layers, and the pixel electrodes 1 and the common electrodes 2 have a structure of V-shape, and a tip region of the structure of V-shape has a protrusion 3 in a direction perpendicular to an initial orientation direction A of positive dielectric anisotropy liquid crystals (as shown in FIG. 6). In the ADS mode electrode unit 6, the pixel electrodes 1 are connected to each other through an oblique arched structure.

In such a pixel structure, the protrusion 3 can make the liquid crystal molecules corresponding to the region of the protrusion be oriented stably under effect of the electric fields, and ensure the display panel with a higher display quality.

Figure 7:
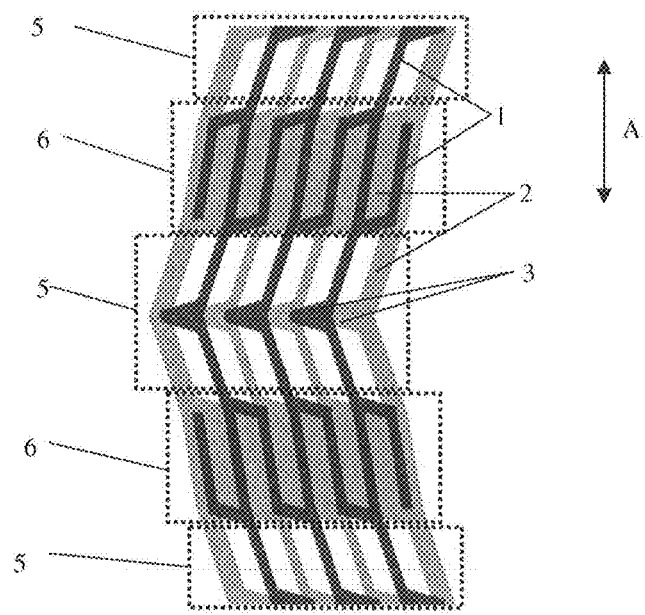
FIG. 7 is a structural schematic diagram of pixel units of a mixed mode display panel according to the fifth embodiment of the present invention.

FIG. 7 is a structural schematic diagram of pixel units of a mixed mode display panel according to the fifth embodiment of the present invention. In the fifth embodiment, the pixel units are composed of the electrode structure of the pixel unit as shown in FIG. 6 to which an ADS mode electrode unit 6 and an IPS mode electrode unit 5 are connected successively in an initial orientation direction A of positive dielectric anisotropy liquid crystals. As shown in FIG. 7, a pixel structure comprises an IPS mode electrode unit 5, an ADS mode electrode unit 6, an IPS mode electrode unit 5, an ADS mode electrode unit 6, and an IPS mode electrode unit 5, which are connected successively in an initial orientation direction A of positive dielectric anisotropy liquid crystals. In the present embodiment, the pixel unit is composed of five electrode units, which can further refine the display effect of pixel.

It should be noted that the structures of pixel units of the embodiments of the present invention are not limited to those as illustrated in the above embodiments; they can also be a repeated combination of more than two identical pixel structures or a combination of different pixel structures, as defined in the foregoing embodiments, or it should be understood that the a simple combination of other forms or deformations also falls into the protection scope of the present invention.

The description hereinafter illustrates the connection relationships between the pixel electrodes and the common electrodes in the display panel of the embodiments of the present invention by example of the pixel structure as shown in FIG. 7.

Figure 8:
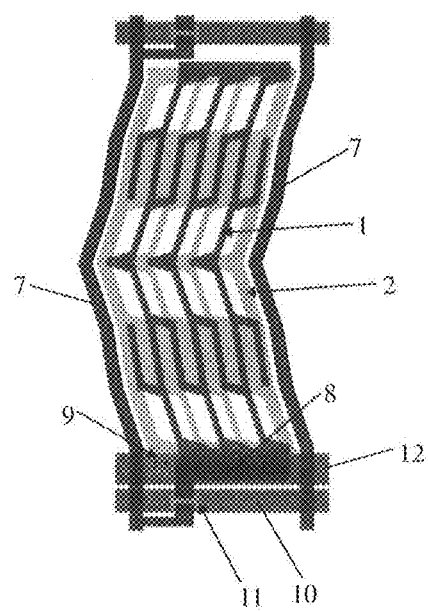
FIG. 8 is a diagram of the connection relations of the electrode units in one single pixel unit of a mixed mode LCD panel according to the fifth embodiment of the present invention.

FIG. 8 is a diagram showing the connection relationships among single pixel unit of a mixed mode LCD panel according to the fifth embodiment of the present invention. As shown in FIG. 8, the pixel electrodes 1 in the pixel are connected to a common line 12 via pixel connection holes 8, and the common electrodes 2 in the pixel are connected to the common line 12 via common connection holes 9; the pixel units are located in a matrix region defined by data lines 7 and gate lines 10, the common line 12 are configured to be parallel to a gate line 10, and a gate electrode of a thin film transistor 11 (TFT) working as switches is connected to a gate line 10. Since the connection manners of various pixel electrodes are the same as that of the conventional pixel electrodes and will not be elaborated here.

The embodiments of the present invention further provide a display device comprising the display panel as defined in the above embodiments. The display device may be any products or devices having display functions, such as LCD panels, electronic paper, OLED panels, LCD TV, LCD, digital photo frames, mobile phones, and tablet PCs etc.

The electrode structures of the IPS mode electrode unit and the ADS mode electrode unit which constitute the pixel units in the embodiments of the present invention are not limited to those as mentioned in the preceding embodiments. It is understood to a person skilled in the art that the electrode structure of a pixel unit shall fall into the protection scope of the present invention, as long as it comprises the IPS mode electrode unit and the ADS mode electrode unit wherein the electrode angle of their own are different, regardless of the amount of the IPS mode electrode unit and the ADS mode electrode unit in the pixel unit.

The foregoing are merely exemplary embodiments of the invention, but are not used to limit the protection scope of the invention. The protection scope of the invention shall be defined by the attached claims.

The invention claimed is:

1. A display panel comprising a liquid crystal layer and a plurality of pixel units, wherein each of the pixel units comprises at least two electrode units, the electrode units comprise an IPS mode electrode unit and an ADS mode electrode unit, the IPS mode electrode unit has an electrode angle different from an electrode angle of the ADS mode electrode unit;
   each of the IPS mode electrode unit and the ADS mode electrode unit comprises a strip-shaped electrode, and each of the electrode angles is an acute angle included between the strip-shaped electrode and an initial orientation direction of liquid crystal molecules in the liquid crystal layer;
   the ADS mode electrode unit comprises a pixel electrode and a common electrode which are arranged in different layers, and one of the pixel electrode and the common electrode comprises a plurality of strip-shaped electrodes that are arranged side by side, each strip-shaped electrode, except two outermost strip-shaped electrodes, is electrically connected with an adjacent strip-shaped electrode which is located at a side of the each strip-shaped electrode only at one end of the each strip-shaped electrode, and is electrically connected with another adjacent strip-shaped electrode which is located at another side of the each strip-shaped electrode only at another one end of the each strip-shaped electrode; and
   the IPS mode electrode unit comprises a plurality of strip-shaped electrodes, and the number of the strip-shaped electrodes that the IPS mode electrode unit comprises is identical to the number of the strip-shaped electrodes that the ADS mode electrode unit comprises.

2. According to the display panel of claim 1, wherein liquid crystals in the liquid crystal layer are positive dielectric anisotropy liquid crystals, the electrode angle of the IPS mode electrode unit is within a range of 10° to 20°, and the electrode angle of the ADS mode electrode unit is within a range of 5° to 15°.

3. According to the display panel of claim 1, wherein liquid crystals in the liquid crystal layer are negative dielectric anisotropy liquid crystals, the electrode angle of the IPS electrode unit is within a range of 70° to 80°, and the electrode angle of the ADS mode electrode unit is within a range of 75° to 85°.

4. According to the display panel of claim 1, wherein liquid crystals in the liquid crystal layer are positive dielectric anisotropy liquid crystals, the pixel unit comprises an additional IPS mode electrode unit, and the IPS mode electrode unit, the ADS mode electrode unit and the additional IPS mode electrode unit are connected successively in an initial orientation direction of the liquid crystals.

5. According to the display panel of claim 1, wherein liquid crystals in the liquid crystal layer are negative dielectric anisotropy liquid crystals, the pixel unit comprises an additional IPS mode electrode unit, and the IPS mode electrode unit, the ADS mode electrode unit and the additional IPS mode electrode unit are connected successively in a direction perpendicular to an initial orientation direction of the liquid crystals.

6. According to the display panel of claim 1, wherein the IPS mode electrode unit is composed of strip-shaped pixel electrodes and strip-shaped common electrodes, which are arranged alternately.

7. According to the display panel of claim 6, wherein the IPS mode electrode unit has pixel electrodes and common electrodes having a structure of V-shape, and a tip region of the structure of V-shape has a protrusion.

8. A display device comprising the display panel according to claim 1.

9. According to the display panel of claim 1, wherein in the ADS mode electrode unit, pixel electrodes are connected to each other through an oblique arched structure.

10. According to the display panel of claim 1, wherein liquid crystals in the liquid crystal layer are positive dielectric anisotropy liquid crystals, the electrode angle of the IPS mode electrode unit is larger than the electrode angle of the ADS mode electrode unit; or liquid crystals in the liquid crystal layer are negative dielectric anisotropy liquid crystals, the electrode angle of the IPS mode electrode unit is less than the electrode angle of the ADS mode electrode unit.

11. According to the display panel of claim 1, wherein the strip-shaped electrodes that the IPS mode electrode unit comprises are corresponding to the strip-shaped electrodes that the ADS mode electrode unit comprises in a one-to-one manner.

* * * * *